Dec. 10, 1968 H. SCHIERHOLT 3,415,969
GAP WIDTH CONTROL METHOD AND APPARATUS
FOR SPARK EROSION MACHINES
Filed Aug. 12, 1965
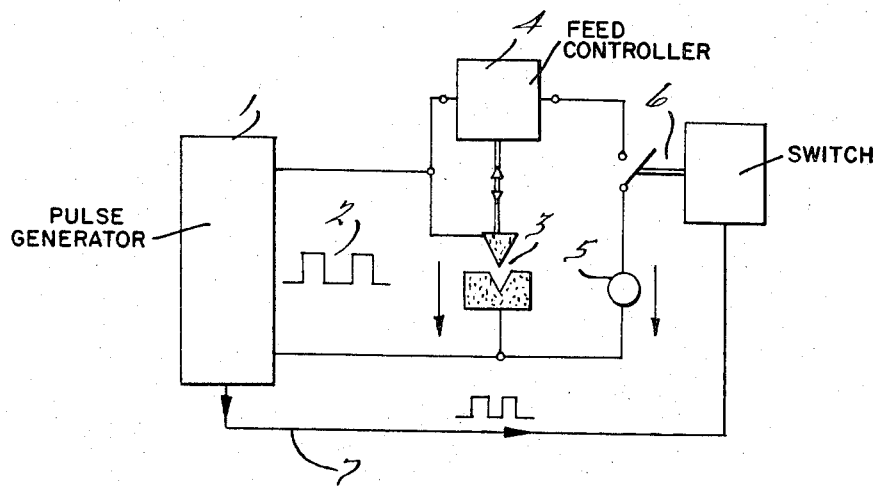
INVENTOR.
Hans Schierholt
BY
Carnness Dickey & Pierce
ATTORNEYS.

United States Patent Office 3,415,969
Patented Dec. 10, 1968

3,415,969
GAP WIDTH CONTROL METHOD AND APPARATUS FOR SPARK EROSION MACHINES
Hans Schierholt, Iserlohn, Germany, assignor to Ingersoll Milling Machine Company, Rockford, Ill., a corporation of Illinois
Filed Aug. 12, 1965, Ser. No. 479,151
Claims priority, application Germany, Aug. 14, 1964, A 46,852
9 Claims. (Cl. 219—69)

ABSTRACT OF THE DISCLOSURE

For a spark erosion machine, a method and apparatus for maintaining a predetermined spacing or gap width between the electrode and workpiece with a fixed reference voltage over a range of operating conditions, including changes in the frequency and duty ratio of the working pulses applied across the electrode and workpiece to provide discharges through the gap. The reference voltage is selected to have a magnitude substantially equal to the voltage of the discharges when the gap is of the predetermined width. To maintain this gap width, pulses of the reference voltages are supplied in synchronism with the working pulses, the voltage of the discharges is compared to the voltage of the reference pulses, and the gap width is adjusted to eliminate any difference between the two.

---

The invention relates to a process for adjusting the feed of tool-electrodes of spark erosion machines and is particularly applicable to spark erosion or electrical discharge machines which run by means of controlled discharge, preferably by square impulse. It is intended to work here by using the spark potential as a test value to measure the size of the operation (tooling) gap between the electrode and the workpiece.

Since it is difficult to measure the tooling gap directly, it has been common to use the average potential at the tooling gap, shortly described as spark-potential, as the test value. For controlled as well as uncontrolled spark erosion machines, the average value of this spark potential (the average voltage across the gap) will normally be proportional to the size of the arc gap. It is therefore possible to control the power feed mechanism so that the control mechanism will adjust the feed, in case of deviations or errors, so that the required tooling gap is reestablished.

With uncontrolled power generating sets (such as those having a power source and a capacitor connected in parallel across the gap and operating essentially as relaxation oscillators), it is quite satisfactory to control the power feed in accordance with the average arc voltage since the required average-value depends but little on the operation-setting of the machine, that is, on the type of impulse and succession of sparks. It is therefore possible to operate with a single reference input over a substantial range of machine settings.

On the other hand, in controlled generating sets (such as those operating with frequency-controlled input pulses), the average value of the spark-potential tends to vary significantly with changes of the setting of the machine, that is, changes of the type or shape of impulse and the succession or frequency of sparks. It is practically necessary to have a reference input for each machine setting. Of course, this would be complicated and it is therefore an objective of this invention to avoid a continuous change of reference inputs and to use only one single reference input for all settings of the machine.

The principles of the invention may be understood from the following description when read with reference to the accompanying drawing of a preferred embodiment of the invention.

In accordance with the principles of the invention, the problem may be solved by using as a reference input voltage one which is switched on and off together with the impulse-voltage, that is to say only when there is impulse voltage. With this method, the voltage at the tooling gap will be compared with a reference input only during discharge. This voltage at the tooling gap during discharge is normally almost independent of the type of impulse and succession of sparks and is dependent on the physical laws of discharge. It is about 20 volts in normal practice and will drop significantly therebelow only when there is an effective short circuit condition at the gap. The voltage will be higher than 20 volts in case the width of the gap is so extensive that no spark-jumping is possible.

These voltage variations from the reference input will be used by the control device for feed adjusting the tool-electrode.

To put this procedure into practice, a switching arrangement is provided in which the feed adjuster, on the one hand, is connected with the tooling gap, and on the other hand to a reference voltage through a switching device, such as a transistor, controlled by the pulse generator. This arrangement permits the difference between the spark-potential and the reference potential, which is switched on only during the time of impulse to be used as input for the feed adjuster for adjusting the spark gap.

Pulse generator 1 may be of any suitable type known to the art. It is assumed that the pulse generator 1 delivers rectangular pulses as indicated at 2. The generator is connected to the working gap 3 and to one terminal of the in-feed controller 4. The second terminal of the controller 4 is connected via switch means 6 to the second terminal of a reference voltage source 5, which supplies a reference voltage of, for example, about 20 volts.

Should a pulsating voltage be available in generator is controlled via a connecting lead 7 by the oscillator of the pulse generator 1, the switch being closed, on or conductive during all or a part of the duration of each pulse. Consequently the difference between the spark voltage and the reference voltage which is applied only during each pulse affects the controller 4 which regulates the in-feed of the working electrode at the working gap 3 in conventional manner with the aid of a servo motor or the like.

Should a pulsating voltage be available in generator 1 which could be used as a reference voltage during pulse generation, then the provision of special switch means at 6 could be dispensed with and the existing pulsating voltage used as the reference.

What I claim is:
1. The method of controlling the in-feed of the working electrode in a spark erosion machine having a working gap, which comprises the steps of producing controlled pulsed discharges at the working gap, producing a pulsed reference voltage in synchronism with the voltage of said pulsed discharges, and regulating the width of the gap in dependence upon the difference between the respective voltages.

2. The method of controlling the in-feed of the working electrode in a spark erosion machine having a working gap across which discharges occur, said method comprising the steps of sensing a reference voltage only during the discharges, comparing the reference voltage sensed with the discharge voltage, and regulating the width of the gap in dependence upon the difference between the compared voltages.

3. In a circuit for controlling the in-feed of the working electrode in a spark erosion machine to control the size of the working gap, said machine including a pulse generator for supplying working pulses across said gap and an in-feed controller, the combination of a switch controlled by said generator, a source for supplying a reference voltage, means including said switch for connecting the in-feed controller to the working gap and to said source supplying the reference voltage for supplying the reference voltage only for the duration of each said working pulse and for controlling the in-feed in accordance with the difference between the voltage of the working pulse and the said reference voltage.

4. A circuit arrangement according to claim 3, in which said switch is a transistor.

5. In a circuit for controlling the in-feed of the working electrode in a spark erosion machine to control the size of the working gap between the working electrode and a workpiece, said machine including generator means for applying generally rectangular time-spaced pulses of electrical energy across the gap with a selectable duration of each pulse and a selectable time between pulses and an in-feed servo system for moving the working electrode in accordance with the magnitude and polarity of a signal reflecting the difference between an applied voltage and a reference voltage, the combination of means for supplying a reference voltage and means for producing effectively the same signal with a given gap spacing and a given reference voltage despite variations in the durations and time spacing of said pulses of said pulses of electrical energy comprising means for sensing the difference between the gap voltage and the reference voltage only during said pulses.

6. In a spark erosion machine having a working electrode spaced from a workpiece and a square-wave generator connected to the electrode and the workpiece and applying periodic pulses thereacross and a servo system including a servo amplifier having two input terminals for moving the electrode, the combination of means connecting one terminal of said amplifier to said electrode, a source of reference voltage, switch means, means connecting said switch means and said reference voltage between the workpiece and the other terminal of the amplifier, and means for closing said switch means only during said pulses.

7. For a spark erosion machine having a working gap defined between an electrode and a workpiece and impulses of selectable frequency and duty ratio applied across said electrode and workpiece to produce electrical discharges through said gap, the method of maintaining a predetermined gap width with a fixed reference voltage regardless of changes in the frequency and duty ratio of said impulses, said method comprising the steps of selecting said reference voltage to be of a magnitude substantially equal to the voltage of said discharges when the gap is of said predetermined width, producing pulses of said reference voltage in synchronism with said impulses, comparing the voltage of said pulses with the voltage of said discharges, and adjusting the width of said gap to eliminate any difference between the compared voltages.

8. For a spark erosion machine having a working gap defined between an electrode and a workpiece and time-spaced impulses applied across the electrode and the workpiece at a selectable frequency and duty ratio to produce electrical discharges through the gap, the method of maintaining a predetermined gap width with a fixed reference voltage regardless of changes in the frequency and duty ratio of said impulses, said method comprising the steps of selecting said reference voltage to be of a magnitude substantially equal to the voltage of said discharges when the gap is of said predetermined width, producing pulses of said reference voltage in synchronism with said impulses, integrating the voltage of said impulses and the voltage of said reference pulses over a period that is long compared to the period of said impulses, comparing the integrated impulse voltage with the integrated reference pulse voltage, and adjusting the width of the gap so as to eliminate any difference between the compared voltages.

9. In a spark erosion machine having a gap defined between an electrode and a workpiece and means for applying impulses of selectable frequency and duty ratio across the electrode and workpiece for producing electrical discharges through said gap, a control system for maintaining a predetermined gap width comprising the combination of reference means for providing a reference voltage which remains fixed at a level substantially equal to the voltage of said discharges when said gap is of said predetermined width regardless of changes in the frequency and duty ratio of said impulses, pulse means coupled to said reference means for providing pulses of said reference voltage in synchronism with said impulses, and control means responsive to said pulses and said impulses and connected to move at least one of said electrode and workpiece in a direction to eliminate any difference between the voltage of said pulses and the voltage of said discharges.

No references cited.

RICHARD M. WOOD, *Primary Examiner.*

R. F. STAUBLY, *Assistant Examiner.*